3,567,798
BLOCK COPOLYMERS CONTAINING CERTAIN
POLAR END BLOCKS
Walter R. Haefele, Orinda, and Alfred W. Shaw and
 Eugene T. Bishop, Moraga, Calif., assignors to Shell
 Oil Company, New York, N.Y.
No Drawing. Filed Feb. 28, 1967, Ser. No. 619,142
Int. Cl. C08f 15/00
U.S. Cl. 260—880          3 Claims

ABSTRACT OF THE DISCLOSURE

Novel block copolymers exhibiting improved processability have the configuration A—B—A—C wherein the polymer blocks A are relatively low molecular weight vinyl arene blocks imparting good processability, B is a polymer block of a conjugated diene and C is a polymer block of certain polar polymerizable monomers selected from the group consisting of monovinyl pyridines, acrylic acid esters, methacrylic acid esters, acrylonitriles, methacrylonitriles, monovinylquinolines and acrylamides, imparting improved stress-strain properties. The subject block copolymers find particular utility in improved adhesive compositions.

---

This invention is concerned with improved block copolymers. More particularly, it is directed to block copolymers exhibiting improved processability and stress-strain properties.

Recent developments in the polymer field have been directed to the production of block copolymers either for thermoplastic uses or for elastomeric utility. It has been found that within certain molecular weight ranges and block proportions elastomeric compositions having the property of being "self-vulcanizing" can be achieved without actual chemical reaction. The reason for this is still somewhat obscure, but is believed to be based upon the formation of networks or domains of thermoplastic blocks which take the place of chemical vulcanizing or cross-linking normally required with rubbers such as natural rubber, polyisoprene, polybutadiene, etc. Among other polymerizable monomers, conjugated dienes and vinyl arenes have been preferred but certain polar compounds have been utilized as well. However, in the latter instance polymer blocks have been incorporated in block copolymers under conditions which would either provide poor structure and thereby poor stress-strain properties, or the molecular weights of the individual blocks and of the total block copolymer have been so high that the products have been difficult if not impossible to process in normal rubber processing equipment. Thus it has been particularly difficult to incorporate other ingredients such as oil or pigments and to extrude or otherwise form or shape these polymers before reaching a temperature of excessive decomposition.

The obvious expedient would be to reduce the average molecular weight of the block copolymers in order to improve processability. However, when this has been done in the past the products obtained have been soft and of poor structural characteristics either not having the desired self-vulcanizing properties or resulting in products in having poor stress-strain properties.

It is an object of the present invention to provide improved block copolymers. It is a particular object of the invention to provide improved block copolymers exhibiting satisfactory processability. A special object of the invention is to provide improved block copolymers exhibiting not only excellent processability but also desirable stress-strain properties.

Now, in accordance with the present invention, novel block copolymers are provided having the general configuration

A—B—A—C wherein each A is a polymer block of a monovinylarene, said block having an average molecular weight between about 4,000 and 20,000, B is a polymer block of a conjugated diene, said block having an average molecular weight between about 5,000 and about 200,000 and C is a terminal of the group consisting of condensed units of polymerizable polar compounds of the group consisting of monovinylpyridines, acrylic acid esters, acrylonitriles, monovinylquinolines and acrylamides, the average terminal comprising 1–100 condensed units of said monomer.

The block copolymers having the above-described configuration have been found to have unexpectedly good processability and at the same time particularly good stress-strain properties in spite of the low molecular weight of the thermoplastic end blocks created by polymerization of the monovinylarenes to form the blocks A. The reason for this exceptional performance again is not clearly understood but it is believed to be due at least in part to the polarity of the terminal C which creates a certain degree of incompatibility not only with the thermoplastic blocks A but more particularly with the elastomeric block B of the conjugated diene. This postulated incompatibility appears to set up a firmer network of the polymer system creating the desired stress-strain properties. On the other hand, it is also postulated that the relatively low molecular weight of the thermoplastic blocks A permits the block copolymer to have the desired degree of processability in normal rubber and thermoplastics processing equipment.

The monovinylarenes from which the polymer blocks A may be prepared include particularly styrene and alpha-methylstyrene as well as alkyl-substituted styrene. The conjugated dienes useful for the preparation of the elastomeric polymer blocks B include especially the conjugated dienes having from 4 to 8 carbon atoms per molecule and particularly contemplate the use of butadiene isoprene as well as dimethylbutadiene. The polar monomers useful for forming the terminal C preferably the vinylpyridines such as 2-vinylpyridine, 3-vinylpyridine and 4-vinylpyridine. Acrylic acid esters of the acrylic acid series include methylmethacrylate, ethylacrylate, methylacrylate, ethylmethacrylate, methylpropylacrylate, and the like. Suitable vinylquinolines include 2-vinylquinoline, 3-methyl-4-ethoxy-2-vinylquinoline, 3-vinylisoquinoline and the like. Acrylonitriles suitable for the formation of terminal C include particularly acrylonitrile methylacrylonitrile, and their homologs, while the acrylamides useful for this purpose include N,N-dimethylacrylamide and N,N-diethylmethylacrylamide. Mixtures of these polar monomers may be utilized (but it is preferred that single species be employed for the formation of the polar terminals). Surprisingly enough, it has been found that a small terminal block is preferred having from 1 to 100 condensed monomeric units.

The block copolymers of the present invention depend in an important aspect upon the relatively low molecular weight (4000–20,000) of the thermoplastic blocks A prepared from the monovinylarenes. As the average molecular weight and proportion of such blocks increases the processability of the resulting block copolymer becomes increasingly difficult. While it is possible to improve the processability of these materials by raising the processing temperatures, it is obvious that the latter alternative is undesirable beyond a certain extent due to stability aspects of these materials as well as to the cost of providing such amounts of heat. Therefore the primary object was to produce a block copolymer which exhibited satisfactory processability at temperatures where thermal decomposition did not become a serious factor and at the same time to obtain polymers having outstanding stress-strain properties. The combination of the low molecular weight monovinylarene polymer blocks and the presence of the surprisingly small terminals of polymerizable monomer resulted in the desired type of polymer in these combined respects. The average molecular weight of the elastomeric block B does not appear to be as critical, but it is contemplated to provide block copolymers wherein the polymer block B is between about 5000 and about 200,000 preferably 10,000–100,000. Where, in the present specification and claims, reference is made to molecular weights, it will be understood that these are determined by intrinsic viscosity measurements which have been correlated with osmotic molecular weights and confirmed by measurements made on tritiated block copolymer units.

The block copolymers of this invention are preferably formed by sequential processes involving the use of alkali metal-based catalysts. Preferably these are lithium-based catalysts and include especially the lithium alkyls such as lithium normal propyl, lithiumisopropyl, lithium normal butyl, lithium secondary butyl and lithium tertiary butyl as well as the corresponding higher homologs such as lithiumpentyls and lithiumhexyls. The block polymerization is normally conducted in the environment of a hydrocarbon which is substantially inert under the conditions of polymerization, which include a temperature range in the order of −50 to +100° C.

The polymerization is conducted by dispersing the initial monomer, namely, the monovinylarene in the inert hydrocarbon solvent which is usually a cycloalkane such as cyclohexane or mixtures thereof with alkanes or alkenes such as isopentane or isopentenes. The initiator such as lithium secondary butyl is then injected into the system and polymerization permitted to occur, the amount of initiator being substantially that required to provide one alkyl metal radical for each growing polymer chain. When the desired average molecular weight is obtained, as measured by intrinsic viscosity measurements or other means, the second monomer (the conjugated diene) is injected into the system which is essentially free of monovinylarene monomer. The block polymerization takes place by the continued polymerization of the conjugated diene on the "living" polymer block of monovinylarene which was initially formed. Polymerization is continued until intrinsic viscosity measurements or other analytical means signal the attainment of the desired average molecular weight of the elastomeric block. Thereafter, the system if necessary is freed of any residual conjugated diene monomer after which a vinylarene monomer is again injected into the system and polymerization continued to form the second block A. As described hereinbefore, the block copolymer at this stage may be regarded as having the general configuration:

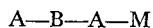

A—B—A—M wherein M is an alkali metal radical. Thereafter the monomeric polar polymerizable compound is injected into the system and polymerization continued if desired or the reaction is terminated after the formation of at least a monomeric terminal of the polar compound; alternatively, a terminal block having up to about 100 (preferably 2–50) monomeric condensed units is permitted to be formed. Termination of the block polymerization is then effected by the use of such chain terminators as water, alcohol or other known terminating agents. The block copolymer is then in the form of a solution (cement) in the reaction system. It may be used as such or may be recovered such as by coagulation with steam or by injection into a non-solvent. Prior to or subsequent to recovery it may be combined with other compounding ingredients such as pigments, extender oils, resins, or other rubber compounds. For example, an adhesive composition could be made employing 100 parts by weight of the block polymers described above and 10–200 parts by weight of a tackifying resin such as a polymerized rosin.

The working examples which are given hereinafter demonstrate the advantages of the present invention in showing that the block copolymers of this invention not only have excellent processability but also possess outstanding physical properties particularly with respect to tensile strength and elongation. Moreover, due to the presence of polar substituents in the terminal section the polymers are especially adherent to metallic surfaces and to other surfaces having a polar character. Thus the polymers have been found to be especially suitable for compounding into adhesive compositions together with resins and/or extending oils. They may be utilized as well in the formation of surface coatings, thermoplastic compositions, elastomeric compositions and the like. They may be compounded with other thermoplastics such as polystyrene, polyethylene or polypropylene as well as with thermoplastic copolymers such as ethylene-propylene copolymer and its elastomeric counterparts. They may be employed as paper coatings or for the impregnation of textiles as well as for the formation of thermoplastic and elastomeric articles of commerce such as shoe soling, toys, athletic equipment including especially aquatic gear, for the impregnation and coating of ropes and twine and for the formation of or bonding of fibers. Due to their excellent processability, they are particularly useful for the latter purposes and because of the outstanding physical properties of these polymers the fiber properties are likewise highly desirable.

They may be combined with other block copolymers such as the "parent" block copolymer from which the polar-terminated polymers of this invention are formed. Thus, the compositions may comprise a block copolymer such as polystyrene-polybutadiene-polystyrene in admixture with a block copolymer of the present invention such as polystyrene-polybutadiene-polystyrene-poly(2-vinylpyridine). In the present instance and due to the excellent processability and physical properties of the subject 4-block copolymers they are especially valuable for addition to the 3-block copolymers from which they are derived but wherein the average molecular weight of the individual polymer blocks is so high as to impart difficult processability thereto. Normally, when extenders are added to polymers for the purpose of improving their processability this results in a degradation of the physical properties of the composition. Oils are particularly notorious in this respect and low molecular weight polymers as well. Contrary to this, however, the addition of the subject 4-block copolymers of the present invention to the block copolymer having the general configuration

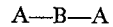

A—B—A results in an enhancement not only in processability but also in the physical properties of the composition beyond that to be normally expected.

The following examples illustrate the preparation and properties of the block polymers of this invention.

EXAMPLE I

For comparative purposes two polymers were prepared, one having the structure

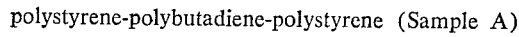

polystyrene-polybutadiene-polystyrene (Sample A)

while the other was this same polymer to which had been added the fourth block, namely, poly(2-vinylpyridine). The block polymer sample A was prepared by a sequential process, utilizing cyclohexane as the solvent and lithium sec-butyl catalyst.

One-half of the above preparation, containing the "living" block copolymer was then treated by the addition of 2-vinylpyridine and polymerization continued at 20–25° C. The sample so treated (sample B) was terminated by addition of methanol. A portion of the latter block polymer was then exposed to gaseous hydrogen chloride to form the hydrochloride of the 4-block copolymer. This is referred to in the data hereinafter as sample C. As shown in Table I, the 3-block copolymer had block molecular weights of 10,000–50,000–10,000, while samples B and C, containing the poly(vinylpyridine) block had an average molecular weight of 5,000 in the latter block.

A similar set of three samples were prepared wherein the samples are designated in Table I as samples D, E and F. In this set, the poly(2-vinylpyridine) block had an average molecular weight of only 500. These samples were then tested at room temperature by the usual ASTM tests and the results obtained are given in Table I. It will be noted that the addition of the vinylpyridine polymer block resulted in more than double tensile strength. Furthermore, the treatment of the sample B with hydrogen chloride resulted in an even greater increase in tensile strength.

Furthermore, it will be noted from the data contained in Table I that even when the poly(vinylpyridine) block was only 500 molecular weight, this still resulted in substantial doubling of the tensile strength and a material increase occurred when this sample was treated with hydrogen chloride.

that even the addition of a single molecule of 2-vinylpyridine to the end of the block copolymer chain resulted in a substantial increase in the tensile strength of the product.

We claim as our invention:
1. A new composition of matter comprising a block copolymer having the general configuration

A—B—A—C wherein each A is a polymer block of a monovinyl arene, said block having an average molecular weight between about 4,000 and 20,000, B is a polymer block of conjugated diene, said block having an average molecular weight between about 10,000 and about 100,000, and C is a terminal of the group consisting of condensed units of polymerizable polar compounds of the group consisting of monovinyl pyridines, acrylic acid esters, methacrylic acid esters, acrylonitriles, methacrylonitriles, monovinyl quinolines and acrylamides, the average terminal comprising 1–100 condensed units of said monomer.

2. A composition according to claim 1 wherein the vinyl pyridine is 2-vinyl pyridine.

3. A new composition of matter comprising a block copolymer having the general configuration TABLE I.—TENSILE PROPERTIES OF FOUR-BLOCK SBS-VINYLPYRIDINE BLOCK POLYMERS [a]

| Sample | A | B | C | D | E | F |
|---|---|---|---|---|---|---|
|  | SBS [b] | SBS-VP [c] | +HCl | SBS | SBS-VP | +HCl |
| Block lengths×10$^{-3}$ | 10-50-10 | 10-50-10-5 | 10-50-10-5 | 10-50-10 | 10-50-10-0.5 | 10-50-10-0.5 |
| Tensile strength at break, p.s.i. | 1,900 | 3,525 | 4,425 | 1,900 | 3,750 | 4,100 |
| 300% modulus, p.s.i. | 275 | 475 | 450 | 275 | 500 | 425 |
| 500% modulus, p.s.i. | 450 | 1,325 | 1,325 | 450 | 975 | 1,200 |
| Elongation at break, percent | 850 | 810 | 840 | 850 | 760 | 760 |
| Set at break, percent | 25 | 50 | 55 | 25 | 35 | 35 |
| Shore A hardness | 63 | 65 | 79 | 63 | 67 | 74 |

[a] Molded 10'/170°C. Short die D specimens, 0.075" thick.
[b] SBS=Polystyrene-polybutadiene-polystyrene.
[c] VP=Poly(2-vinylpyridine).

EXAMPLE II

A similar preparation was made by the process described in Example I wherein the initial polymer had the structure polystyrene-polybutadiene-polystyrene whose average molecular weights were 10,000–50,000–10,000. While the polymer was still living, part of this sample was modified by the further addition of a single molecule of 2-vinylpyridine at the end of each polymer chain. The polymers so prepared were then tested and had the following physical properties.

TABLE II.—TENSILE PROPERTIES OF SEQUENTIAL FOUR-BLOCK SBS-VP POLYMERS [a]

| Sample | G | H |
|---|---|---|
|  | SBS | SBS-VP |
| Nominal block lengths×10$^3$ | 10-50-10 | 10-50-10-0.1 |
| Tensile strength at break, p.s.i. | 2,850 | 4,300 |
| 300% modulus, p.s.i. | 425 | 350 |
| 500% modulus, p.s.i. | 575 | 500 |
| Elongation at break, percent | 1,050 | 1,130 |
| Set at break, percent | 20 | 30 |
| Shore A hardness | 67 | 66 |

[a] Molded 10 minutes at 160° C. Short die D specimens, 0.070" thick.

From the above comparison in Table II, it will be seen polystyrene - polybutadiene-polystyrene - (vinyl pyridine)$n$ wherein each polystyrene block has an average molecular weight between about 4,000 and 20,000, the polybutadiene block has an average molecular weight between about 10,000 and about 100,000 and the vinyl pyridine)$n$ is a terminal comprising condensed vinyl pyridine units and $n$ is an average integer between 2 and 50.

References Cited

UNITED STATES PATENTS

| 3,078,254 | 2/1963 | Zelinski et al. | 260—880 |
| 3,135,716 | 6/1964 | Uraneck et al. | 260—880 |
| 3,239,479 | 3/1966 | Harlan | 260—27 |

FOREIGN PATENTS

| 832,700 | 4/1960 | Great Britain | 260—880 |

DONALD E. CZAJA, Primary Examiner

W. E. PARKER, Assistant Examiner

U.S. Cl. X.R.

260—27, 336, 887, 892